US005324157A

United States Patent [19]

Stolzer

[11] Patent Number: 5,324,157

[45] Date of Patent: Jun. 28, 1994

[54] COMBINED MATERIAL HANDLING AND WEIGHING APPARATUS

[75] Inventor: Armin Stolzer, Renchen, Fed. Rep. of Germany

[73] Assignee: Keuro Maschinebau GmbH & Co. KG, Achern-Gemshurst, Fed. Rep. of Germany

[21] Appl. No.: 841,371

[22] Filed: Feb. 25, 1992

[30] Foreign Application Priority Data

Apr. 25, 1991 [DE] Fed. Rep. of Germany ....... 4113459

[51] Int. Cl.[5] ................ B65G 1/04

[52] U.S. Cl. ................ 414/281; 414/21; 414/273; 414/286; 364/478; 177/147; 177/245

[58] Field of Search ................ 414/277, 281, 798.1, 414/797.5, 286, 268, 274, 674, 795.2, 266, 267, 273, 745.7, 745.1, 749, 21, 667, 663, 664, 668; 364/478; 211/60.1, 69, 70.4; 294/81.51, 81.6, 81.61; 177/142, 145, 147, 245, 60

[56] References Cited

U.S. PATENT DOCUMENTS

| | | | |
|---|---|---|---|
| 2,643,781 | 6/1953 | Wise | 414/21 |
| 3,810,404 | 5/1974 | Stolzer . | |
| 4,252,486 | 2/1981 | Soligno | 414/276 |
| 4,778,325 | 10/1988 | Stolzer . | |

FOREIGN PATENT DOCUMENTS

| | | | |
|---|---|---|---|
| 1531912 | 9/1969 | Fed. Rep. of Germany . | |
| 1698108 | 2/1972 | Fed. Rep. of Germany . | |
| 2163101 | 7/1973 | Fed. Rep. of Germany . | |
| 3012826 | 10/1981 | Fed. Rep. of Germany . | |
| 3315170 | 10/1984 | Fed. Rep. of Germany . | |
| 3503390 | 8/1985 | Fed. Rep. of Germany . | |
| 3744194 | 7/1989 | Fed. Rep. of Germany . | |
| 3802332 | 8/1989 | Fed. Rep. of Germany | 414/21 |
| 93125 | 4/1987 | Japan | 414/21 |
| 417414 | 2/1967 | Switzerland | 414/281 |

OTHER PUBLICATIONS

"Fördern und Heben" (Transporting and Lifting), vol. 19 (1973), Issue 8, pp. 29–31.

"Maschinenmarkt" (Machinery Market), Würzburg 80 (1974), p. 1135.

"Fördern und Heben" (Transporting and Lifting), vol. 22 (1972), Issue 17 pp. 957–960.

Integration of Weighing into Transport Procedures by Electromechanical Crane Hoists: (1973 Heft 8 pp. 29–31).

Rational Operation in a Store for Elongated Goods with a Shelf-loading Transporter: Würzburg 80 (1974), p. 1135.

Electrical Measuring of Mechanical Values in Hydraulic Excavator (1972) Nr. 17, pp. 957–960.

*Primary Examiner*—Frank E. Werner

*Attorney, Agent, or Firm*—Frishauf, Holtz, Goodman & Woodward

[57] ABSTRACT

A shelf service apparatus is provided in the form of a crane for a store for rod-like material accomodated in self-supporting magazines or pallet boxes, where the store comprises shelving units arranged transversely of the storage space and aligned with one another in the direction of the storage space, which units comprise vertical shelf supports (2) with carrier arms (3) secured thereon one above another so as to extend in the direction of the storage space, for the magazines (4). The crane has load supporting forks (12) movable up and down by guide devices (16), with reception brackets (13) by which the magazines can be grasped and moved. To weigh the material in the pallet boxes, a receiver (18) is arranged, with spacing, on the forward portion of the reception brackets (13). The receiver is supported by transverse beams (20) in relation to the reception bracket 13. Weighing cells (**20*a*) are coupled to the beams. The transverse beams extend horizontally and are secured with one end (23) to the receiver (18) and with the other end (21) on the reception bracket (13). (FIG. 3**).

19 Claims, 8 Drawing Sheets

6
8
4
14
2
12
13
5
7
9
3
10
16a
16
IV
16b
7a 1
2
3
4
7
8
9
10
11
16

14
15
18
12
17
5
13
4
2
3
19

28
27
31
4
20
13
5
14
20
V
V
30
31
17

2
4
17
5
14
3
VI
15
33
5
28
34
18
30
31
20
19
32
12
13
3
VI 28
18
25
24
26
23
29
32
31
V
V
20a
20
21
13
21
22
20
20a
5
4
29
27
28
24
23
VIII
V
2

28,29
5
36
37
18
25
24
26
23
35

25

24
22
21
26
35
23
20a
20
13

COMBINED MATERIAL HANDLING AND WEIGHING APPARATUS

Reference to related patents, the disclosures of which are hereby incorporated by reference:

U.S. Pat. No. 4,778,325, Stolzer and Blust

U.S. Pat. No. 3,810,404, Stolzer

Reference to related publication:

German DE 35 03 390, Dornieden.

Reference to related application, the disclosure of which is hereby incorporated by reference, and assigned to the assignee of the present application:

U.S. Ser. No. 07/841,373, filed Feb. 25, 1992, now U.S. Pat. No. 5,281,070 STOLZER.

FIELD OF THE INVENTION

The present invention relates to combined material handling and weighing apparatus, and more particularly to apparatus, including a crane, to handle elongated material, for example rods, pipes, or other rod-like material, which are located either individually or on shelves, and especially retained within magazines or pallet boxes retained on the shelves. The shelves form a storage region or yard or shed, having shelving units arranged transversely of the storage space and aligned with one another in a longitudinal direction.

BACKGROUND

Material, particularly elongated material, storage systems are known which include shelving units having vertical shelf supports with carrier arms secured thereon, one above another, so as to extend in the longitudinal direction, for carrying the magazines or pallet boxes. A crane is movable in the longitudinal direction and has carriages movable up and down along vertical guide means. Each carriage comprises a load fork with a vertical wall and a support bracket extending, in use, horizontally into the region of the store for engaging under legs protruding horizontally outwards from the ends of the magazines, in order to move the magazines within and between lanes separating the units.

Such material handling apparatus are disclosed, for example, in the referenced U.S. Pat. No. 4,778,325, and have a conveyor, movable on rails above the shelving units, from which load beams are vertically movably supported on carriages on both sides of the shelving units, the load beams moving, with guide means therefore, within the outline of the outer shelving unit supports. Load forks are horizontally movable in the storage space direction on the load beams. In this way, the load forks are vertically and horizontally mobile.

There is a need to ascertain the weight of each magazine taken up, as exactly as possible, in order to obtain an indication as to the degree to which the magazine is still filled, or whether perhaps a replenishment is necessary.

For this purpose, in the known apparatus, the conveyor portion mobile above the shelving units is divided into frame portions which are vertically supported one against the other through pressure cells. This form of construction, however, necessitates a relatively voluminous and expensive configuration for the conveyor. Moreover, it has the disadvantage that besides the weight of the magazine, the weight of the upper frame portion, which is supported on the lower frame of the conveyor via the pressure cells, and the weight of the load beams, the load forks and of the lifting means for moving the load beams is also weighed at the same time, so that the accuracy and fine sensitivity of the weighing apparatus are undesirably influenced.

Material handling apparatus in the form of gantry cranes are also known, for example, from U.S. Pat. No. 3,810,404. In this form of construction, it is not possible to provide weighing apparatus at a reasonable expense and, if a weighing apparatus were provided at all, it would involve an extraordinarily great loss of space.

Finally, material handling apparatus are known, such as these shown for example in German Patent DE-PS 35 03 390 C3, Dornieden, in which a gantry-type traveling crane is divided into two individual conveyor devices in the form of the initially mentioned vertical guide means which are mutually independently mobile but can be controlled synchronously.

THE INVENTION

It is an object to provide a material handling or servicing apparatus of the initially stated kind in which the weighing of magazines or pallet boxes is possible for different forms of construction of crane and practically independently of the form of construction of the crane, without appreciable other parts having to be weighed each time as well as the magazine. The cost and space requirement should be low, and practically no modification on the usual shelf form of construction and existing apparatus should be required.

Briefly, the rod-like material is accomodated in self-supporting magazines; the store is formed by shelving units arranged transversely of the storage space and aligned with one another in the direction of the storage space. The shelving units comprise vertical shelf supports with carrier arms secured thereon one above another so as to extend in the direction of the storage space for the magazines. A crane is mobile in the direction of the storage space and has carriages movable up and down along vertical guide means. Carriages, each comprising a load fork with a vertical wall and reception bracket extending, in use, horizontally into the region of the store for engaging under legs protruding horizontally outwards from the ends of the magazines move the magazines up and down and transversely of lanes between the units, and in them.

In accordance with a feature of the invention, a receiver is arranged, with spacing, over a forward portion of the reception bracket, the receiver being supported over weighing cells in the form of horizontal transverse beams in relation to the reception bracket. The transverse beams are secured with their one ends remote from the reception bracket on the receiver and with their other ends on the reception bracket.

As a result of these measures, the weighing apparatus is brought directly to the end of the magazines so that apart from the receiver the weight of which is comparatively low, no parts have to be weighed together with the respective magazine.

Due to the fact that transverse beams of the stated arrangement and design are used as weighing cells, no extra space is required in the region of the pairing of reception bracket/leg of the magazine, at least in the horizontal direction, so that the design of the shelving units and also of the other crane parts can remain within the available space, i.e. of what was usual hitherto. The transverse beams thus practically disappear, as viewed in the vertical direction, in the region which is in any case occupied by the horizontal legs of the magazines.

Preferably, the width of the reception bracket in the direction of the storage space substantially corresponds to the length of the two associated ends of the transverse beams connected with the reception bracket. The reception bracket is thus relatively narrow compared with the forward end formed by the receiver, so that a T-shaped cross section, as seen in vertical projection, of the entire reception bracket occurs. This provides the possibility that the transverse beams secured on the reception bracket, and conveniently for reasons of space secured from beneath against the reception bracket, can move freely in the vertical direction.

A further advantage of this T-shaped form of construction consists in that now the externally situated shelf supports can be made flatter transversely of the storage space, and protruding towards the front region of the magazines as seen in the direction of the storage space, whereby the store can be made narrower as a whole transversely of the storage space. In particular, the reception bracket of T-shaped formation can drive partly with its front ends behind such flatter and wider outer shelf supports in order to take up the magazines by their legs.

With reference to the receiver, which can engage beneath and entrain the magazines, this can in principle be the transverse beam ends remote from the reception bracket, which may engage directly with the legs of the magazines. It is however preferred that the receiver comprises a reception beam, the horizontal cross-section of which corresponds substantially to the region occupied by the legs, and that the transverse beams are secured with their ends remote from the reception bracket to narrow ends of the reception beam. Thus, the reception beam provides a receiver of larger area for the legs of the magazines, which has a favourable effect upon operational safety.

The legs fitted on the ends of the magazines can be legs continuing in the direction of the storage space over practically the entire end of the magazines. However, for example two or three legs which are relatively narrow in the direction of the storage space may be provided on each magazine end just as well. The essential point is only that the free ends of the transverse beams facing away from the reception bracket, in their stroke movement for the engaging of the magazines receive or encounter an associated leg piece carried by the magazines.

Advantageously, the horizontal cross-section of the reception beam is larger in the direction of the storage space and smaller transversely thereof than the region occupied by the legs. Thus, a certain space results transversely of the storage space, which makes the excessive observance of tolerances superfluous. The reception beam may also have upwardly extending noses at its ends, the spacing of which corresponds to the width of the region occupied by the legs in the direction of the storage space, and the noses can be bevelled in a direction away from the legs, towards their free ends. In this way, a simple adjustment of the legs of the magazines on the reception beam concerned is in each case possible.

As for the transverse beams, it is preferred that they are elongated in the direction of the storage space and narrow in both transverse directions thereto. Furthermore, it is advantageous that the load-caused deformation of the transverse beams is convertible into an electrical signal, which then can be transmitted in a simple manner to the control desk of the installation. The electrical signal can be produced simply in a known manner for example in that the transverse beam is fitted with what are called strain gauges. These strain gauges can either be arranged at top and bottom on the transverse beam, in order to take up bending deformations, or they can also be arranged laterally on the transverse beam, in order to ascertain the shear stresses. Such forms of construction of the transverse beams are known in other contexts.

It is also preferred that the securing of the ends of the reception beam on the associated ends of the transverse beams is through spring-elastic means. This derives from the fact that for a clean ascertainment of weight only vertical forces may be transmitted to the transverse beams. Forces directed transversely thereto by jamming or the like, would falsify the expression of weight. By the arrangement of the said spring-elastic means, however, in the direction of the storage space, and also transversely thereof, a certain yielding of the reception beam and thus reduction of horizontal forces is guaranteed.

The spring-elastic means can be formed as elastomer or rubber buffers, and it is advantageous that the buffers are covered on their sides facing the reception beam and the transverse beam by plates of hard material, for example metal plates, and that they are connected with these plates by vulcanisation or sticking.

It is further desirable that the receiver is supported with play in relation to the load fork longitudinally and transversely of the direction of the storage space. This supporting serves to detect forces which cannot be taken up by the buffers. Such horizontal force compensation has to include play in order to avoid extreme force conditions and in order to render possible a correct weighing result.

This supporting is advantageously achieved by bolts secured to the receiver, which extend with radial play into bores of the load forks, the bolts comprising at their end remote from the receiver, a widening of cross-section, for example in the form of a cylindrical head, which is seated with axial and radial play in a corresponding widening of the bores of the load forks.

Normally, it is simplest that the transverse beams extend exactly parallel to the ends of the magazines. However, according to the construction of the shelving units, there may be a need to take the transverse beams somewhat back from the outer shelf supports, on account of their external dimensions. For this purpose it can be expedient for the ends of the transverse beams connected with the reception bracket to have a greater spacing from the ends of the magazines than the ends connected with the reception beam. The transverse beams are then set somewhat obliquely in the stated manner, and consequently are shifted somewhat together in relation to their ends connected with the reception beam. This in fact signifies, transversely of the storage space, a somewhat longer form of reception bracket, which however stays within the scope of the negligible. The above-described T-form of the receiver with its own advantages is, however, still maintained.

Finally, it is preferred that, in the region of its two ends, the reception beam carries sensors for the testing of parallelism between reception beam and legs. The sensors can be contactless space gauges. This measure is advantageous in order to be able to ascertain and then correct an occurrence of a complete askew position between the legs and reception beam. Such an askew position can occur for example when the reception beam, in engaging the legs, applies itself to the legs extremely eccentrically, so that the legs come to lie on one of the end noses of the reception beam and can no longer slide down the oblique face of this nose for adjustment.

The invention as thus described is also suitable for use with those load forks where the receiver can be hinged upwards out of the shelving unit region. Such load forks can be used with gantry cranes, but also with conveyors according to the already above mentioned German DE-PS 35 03 390 C3, Dornieden, and render possible travel between magazine places, without the load forks for this purpose having to be driven upwards in a shelf gangway, then driven over the shelving units and then let down again in the next shelf gangway. In this way, what are called diagonal journeys of the load forks are possible. If the invention is used with such hinged forks, by pivoting the reception bracket upwards the additional advantage is gained that the bending apparatus is then situated between the reception bracket, and the vertical wall of the fork in an especially protected position. Here too, the above-described T-form of the receiver is especially advantageous.

DRAWINGS

The invention is described further, by way of example, referring to an embodiment in the form of a gantry crane as illustrated in the accompanying drawings, wherein.

DETAILED DESCRIPTION

Figure 1:
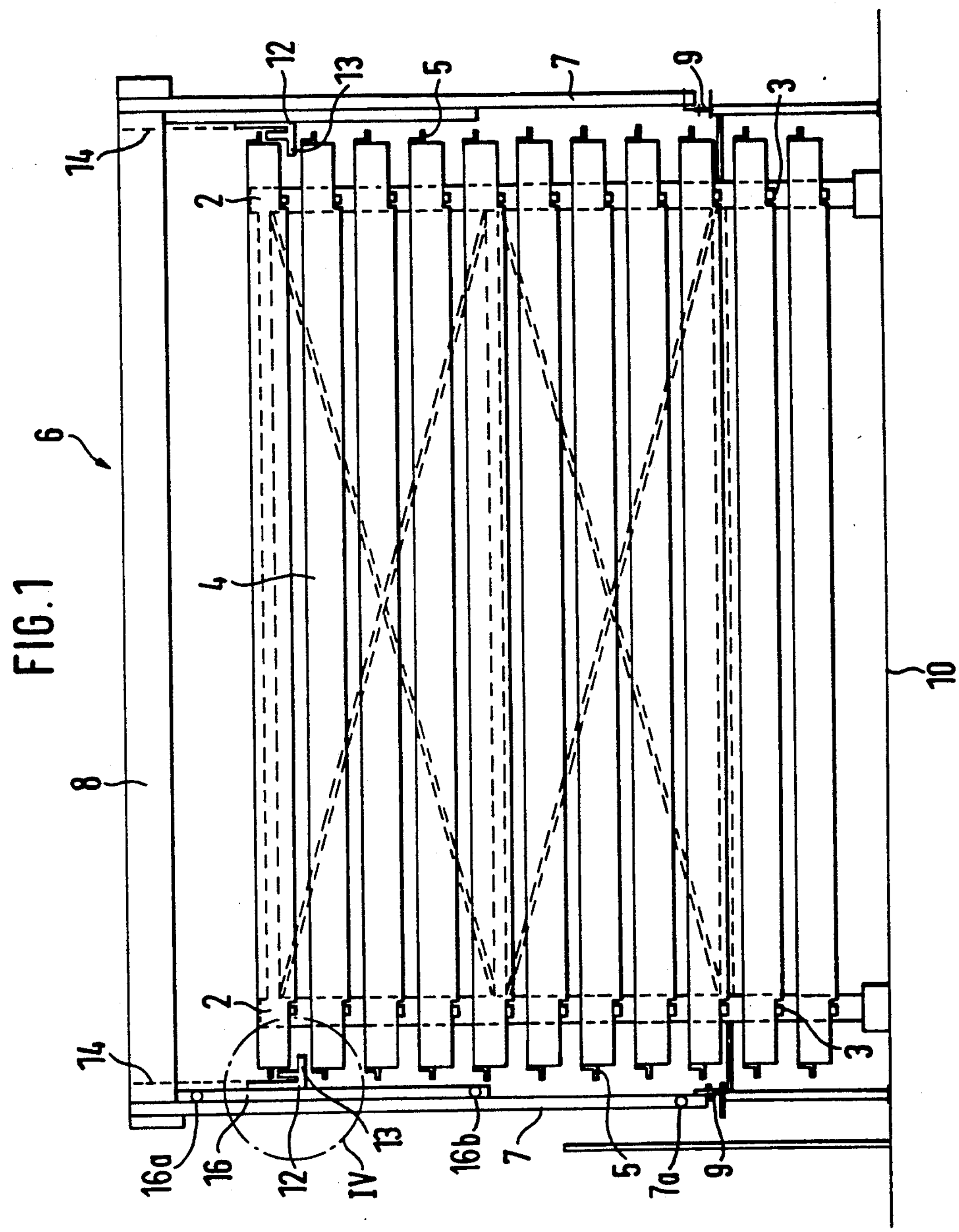
FIG. 1 is a cross-section through a material store looking in the longitudinal direction of its storage space and showing a shelving unit, which is filled with magazines.
Figure 2:
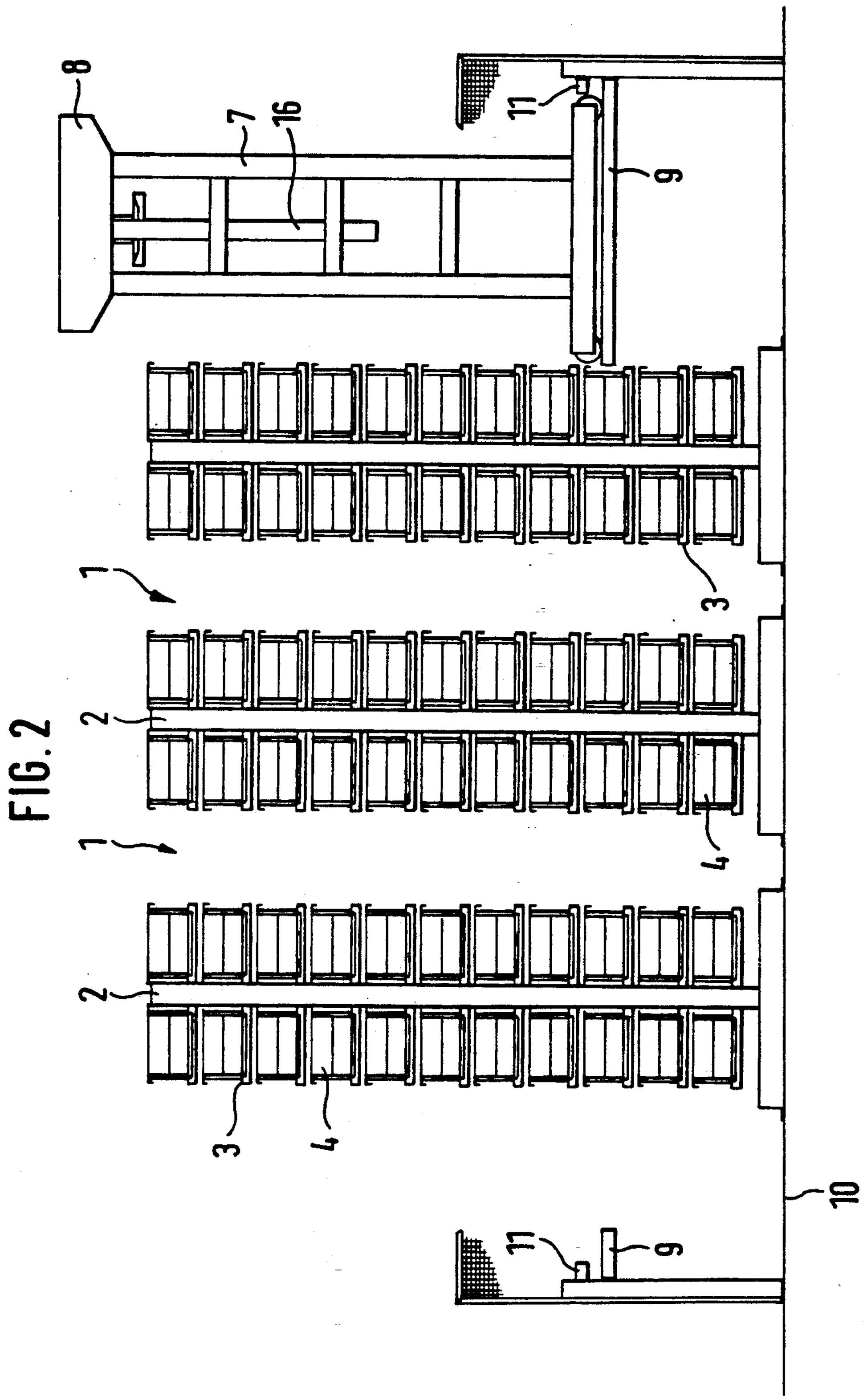
FIG. 2 is a simplified lateral elevation of the material store of FIG. 1.

As may be seen from FIGS. 1 and 2, the material store contains any desired number of shelving units arranged side by side in the longitudinal direction of the storage space, leaving shelving unit lanes 1 therebetween. The units have shelf supports 2 having carrier arms 3 secured thereto to define shelf compartments therebetween, arranged one above another on both sides of the supports 2 of the individual shelving units.

Magazines 4 are placed upon the carrier arms 3 in the shelf compartments. These magazines have at their ends L-shaped sections providing horizontal legs 5, which are directed horizontally outwards and by means of which the magazines can be taken up and transported—as will be described later.

A gantry crane 6, having crane supports 7, and a head part 8 connecting the supports at a level above the shelving units, is movable over the shelving units arranged one beside another in the longitudinal direction of the storage space. The crane supports are movable at the bottom on rails 9, which are arranged a considerable distance above the floor 10 of the installation. Thus, beneath these rails 9, the rod-like material can be brought into and out of storage with regard to the magazines. Rods can be taken from the magazines so as to feed them, for example, to a processing machine.

In order to limit the travel of the gantry crane 6, stops 11 are provided on the ends of the rails 9, as shown in FIG. 2.

As shown in FIG. 1, load forks 12 having reception brackets 13 are vertically movable by hoist or lifting means 14 on the crane supports 7, by which hoist means the individual magazines 4 can be taken up by engagement with the end legs 5. The load forks 12 are seated on carriages 15 (see FIGS. 3 and 5), which are vertically movable along elongate guide sections 16 on the crane supports 7. These guide sections 16 are likewise vertically movable on the crane supports 7. The length of the guide sections is selected so that they can bridge over the interval between the rails 9 and the floor 10. Sliding movement of the carriages 15 on guide sections 16 takes place as follows:

Carriage 15 is slidable in guide sections 16 between upper and lower stops 16*a*, 16*b*, shown only schematically in FIG. 1. If the carriages 15 are lowered by a hoisting means, such as a chain 14, along the crane supports 7, the guide sections 16 reach a point at the foot of the crane supports 8 where the guide sections with the stops 16*b* fitted on their lower ends run up to the foot point stop 7*a* (FIG. 1) of the crane supports. The length of the guide sections 16 extends into the region between rail 9 and floor 10. If the carriages 15 are lowered further by the hoist, they move along the lowered guide sections 16 and they can bridge over the zone between the rail 9 and the floor 10. The arrangement is similar to a suspension file drawer slide.

On lifting the carriages 15 by the hoist, the carriages first run up on the guide sections 16, then come against stop means at the upper end of the guide sections and then in their further journey upwards entrain the guide sections 16, by means of these stop means.

Figure 3:
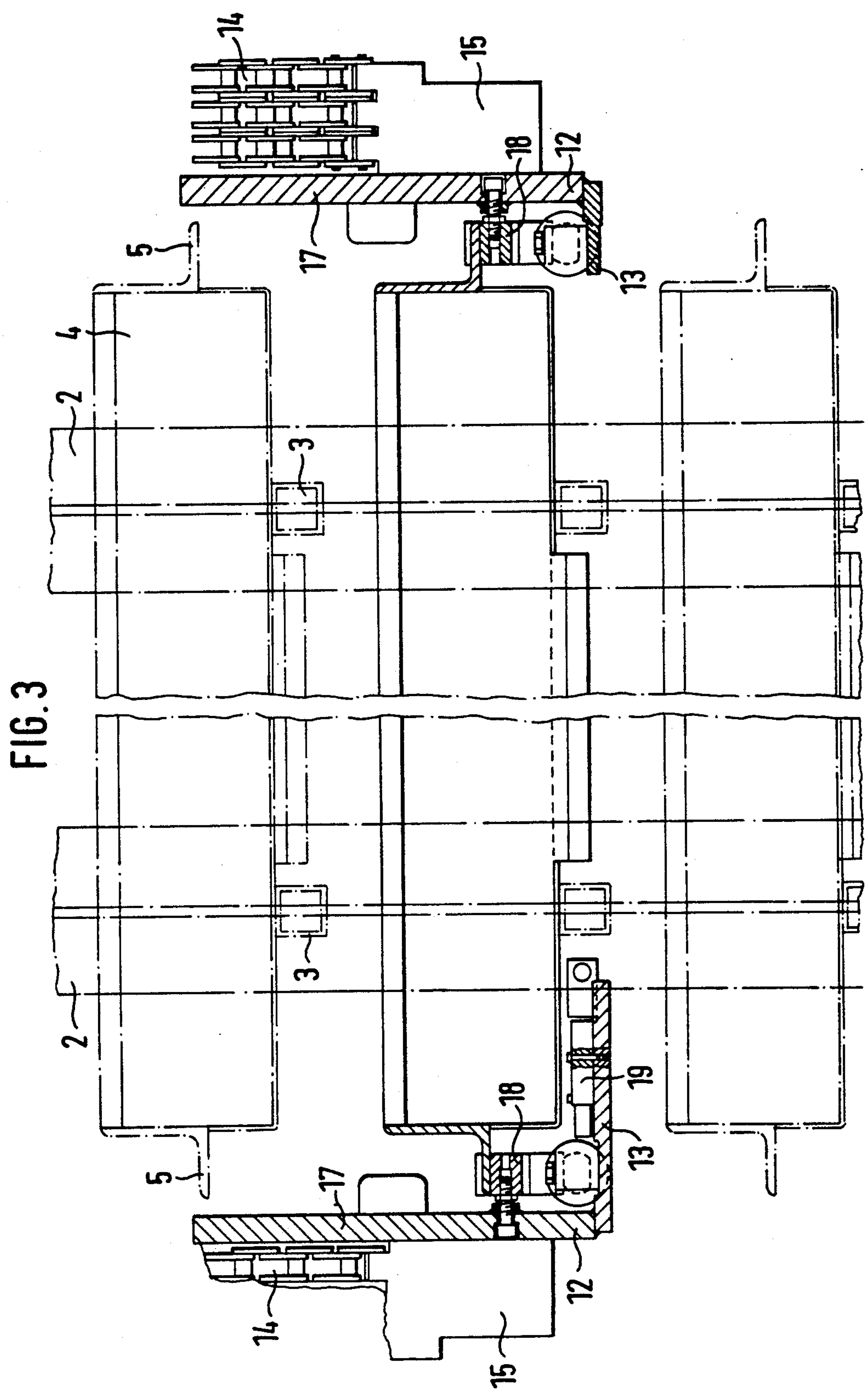
FIG. 3 is a cross-section through a portion of the material store of FIG. 1 showing load forks in enlarged representation.

FIG. 3 shows a portion of FIG. 1 including the load supporting forks 12 in enlarged representation. As shown in FIG. 3, each load supporting fork 12 has a vertical wall 17 and a support bracket 13 which are welded together. The bracket 13 in each case carries a reception beam 18, engageable under the lower surfaces of the legs 5 of the magazine 4, so that the magazine or pallet box 4 can be raised or lowered. Sensing means 19, e.g. pressure switches, may be provided to ascertain whether or not the relevant compartment contains a magazine. These sensing means are optional.

Figure 5:
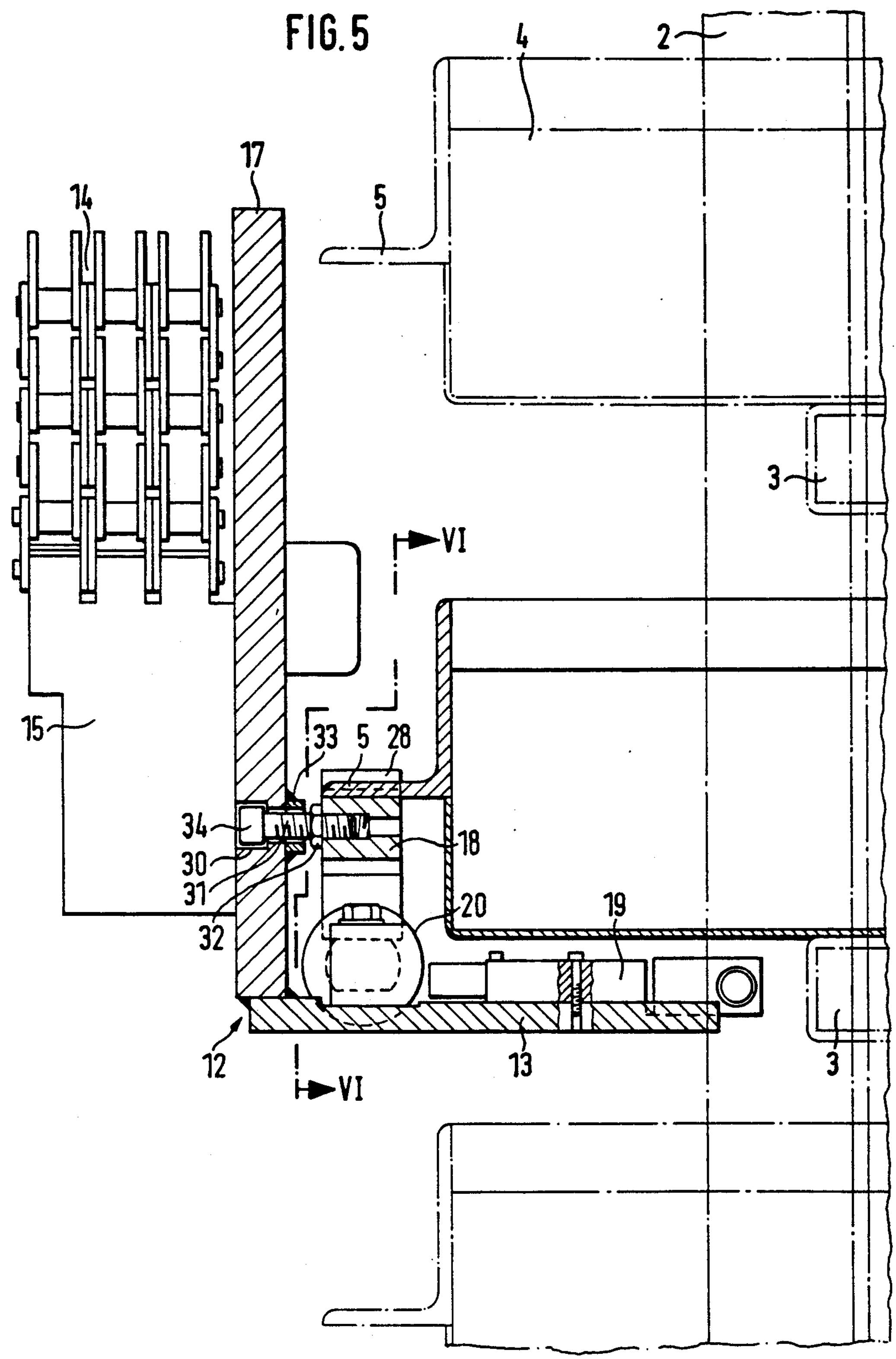
FIG. 5 is a sectional view along the line V—V in FIG. 4.
Figure 6:
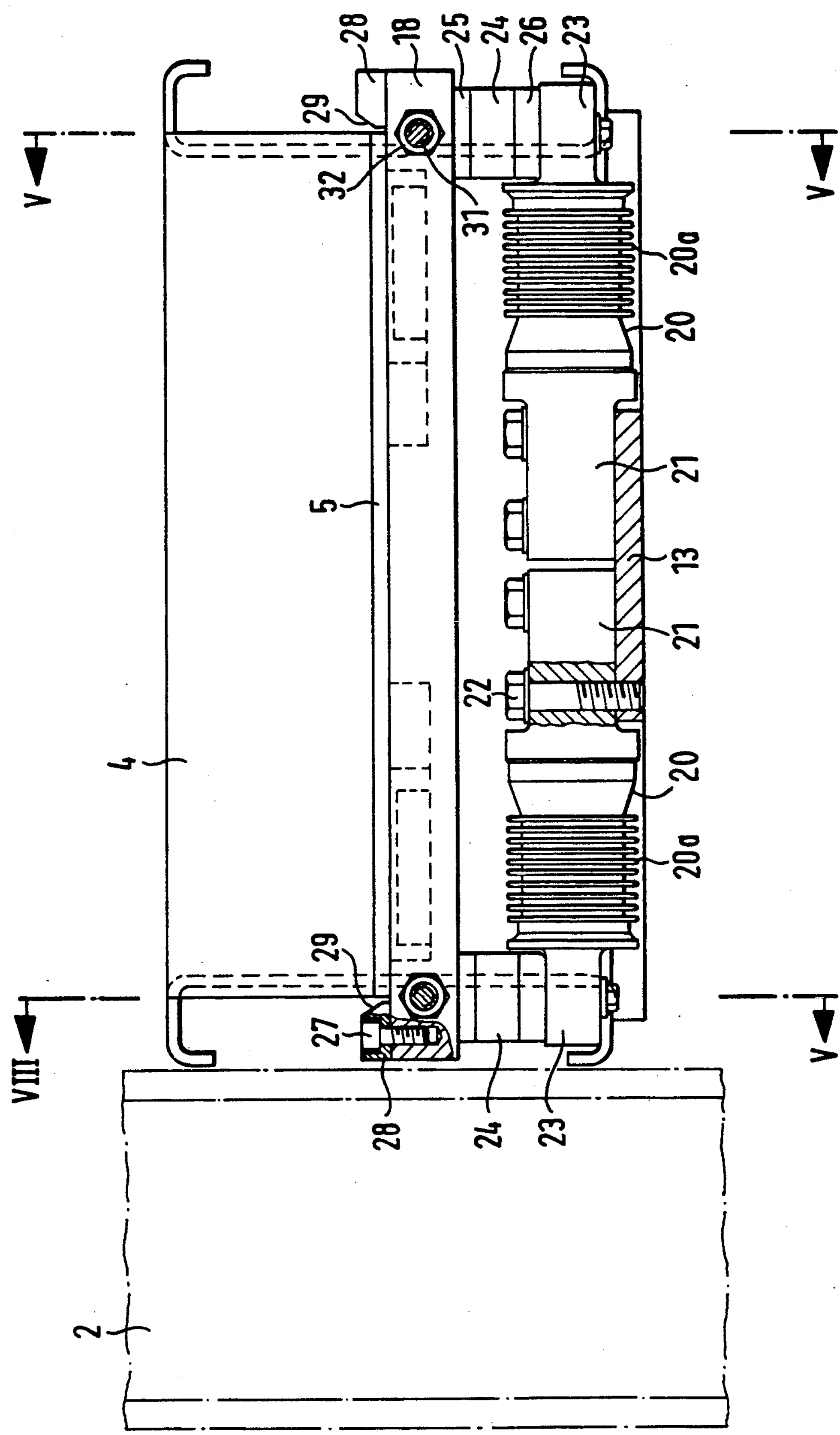
FIG. 6 is a sectional view along the line VI—VI in FIG. 5.

Further details will now be explained with reference to FIGS. 4 to 6 which show the left load fork 12 from FIG. 3, enlarged and in plan view, in lateral elevation partially in section, as in FIG. 3, and in section along the line VI—VI of FIG. 5, respectively.

In accordance with a feature of the invention, the weighing system includes a reception beam 18 (see FIG. 6) which is arranged, with spacing, above the reception bracket 13 and is secured thereto by means of transverse beams 20. The transverse beams each have a free end 23 and a bracket fastening end 21. End 21 is secured to the reception basket 13 by screws 22.

External or free ends 23 of the transverse beams 20 support the ends of the reception beam 18 through rubber mounts or buffers 24, the rubber buffers being connected at top and bottom with plates 25, 26, for example by vulcanization.

The reception beam 18 carries at both ends noses 28 secured by screws 27. The noses 28 have oblique faces 29, which are directed towards the leg 5. The noses 28 provide for centered position of the magazine 4 in relation to the reception beam 18.

A load indication is obtained by sensing deflection of the beams 20. This deflection can be sensed by strain gauges 20*a* placed on beams 20, so that deformation out of their unloaded positions can be sensed as an electric signal which is then evaluated. In this way, the weight of each magazine 4, including the material contained therein, as well as only of the reception beam 28 and the rubber buffers 24, can be ascertained very exactly without further individual parts being weighed in each case.

The rubber buffers 24 have the purpose of preventing transmission of horizontal transverse forces which would falsify the ascertainment of weight. In order to avoid an excessive deflection of the rubber buffers 24 and thus their overstressing and, as best seen in FIG. 5, the reception beam 18 is provided at each of its two ends with a bolt 31 extending into a bore 30 of the vertical wall 17. This bolt can be screwed into the reception beam 18 and made fast by a locking nut 32, as in the example illustrated.

In order to leave normal play for the rubber buffers, the bolt 31 has play in the bore 30. Moreover, it also has play on both sides in its axial direction. On the one side, the play is given by the distance of the locking nut 32 from the facing surface of the vertical wall 17, which in the present case is drawn forward in the direction towards the reception beam 18 by a welded-on sleeve 33. In the other direction, the limitation of play is effected by a head 34 on the free end of the bolt 31, for which the bore 30 is appropriately widened in diameter.

Figure 7:
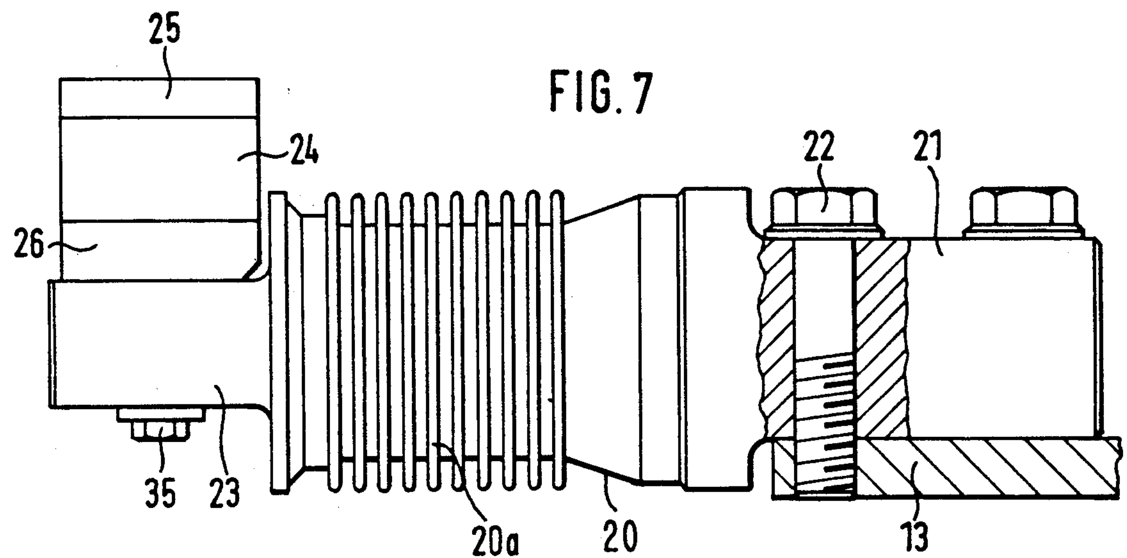
FIG. 7 shows a detail from FIG. 6 in enlarged representation.

FIG. 7 shows the left transverse beam 20 according to FIG. 6 once again, in enlarged representation, omitting the reception beam and the magazine. FIG. 7 serves merely as a more clearly laid-out individual presentation.

Figure 8:
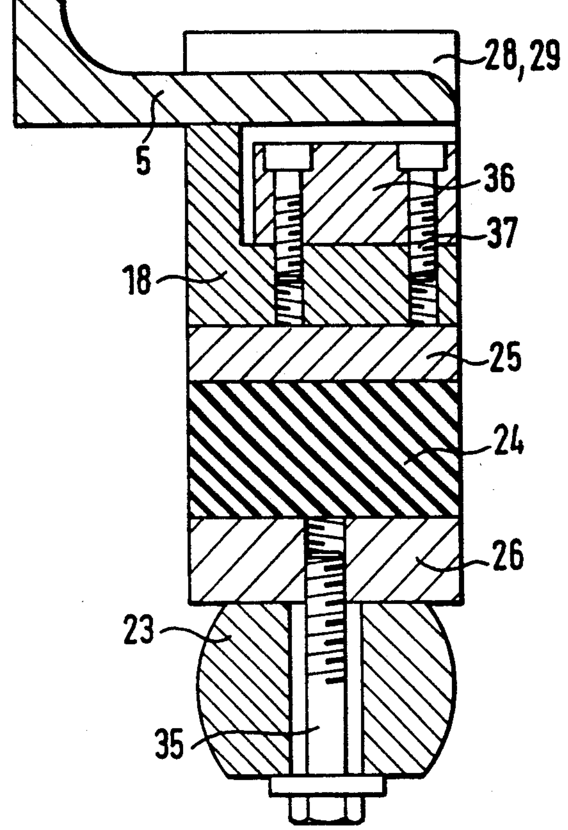
FIG. 8 is a sectional view along the line VIII—VIII in FIG. 6.

FIG. 8 shows how the rubber buffers 24 associated with the ends 23 of the transverse beams 20 are secured on these ends. Screws 35, which penetrate the end of 23 of the transverse beam and are screwed into a threaded opening in a lower plate 26 of the rubber buffer. A similar fastening (not shown) of the reception beam 18 on an upper plate 25 of the rubber buffer 24 may be used.

Sensors 36 can be inserted by means of screws 37 into the reception beam 18 in the region of the rubber buffers 24 which sensors 36 serve to detect the distance of the legs 5 from a or reference. Two such sensors are provided, one at either end of the reception beam 18. Thus, an oblique or inclined position of the magazine or of the leg 5 in relation to the reception beam 18 can be ascertained. This may occasionally occur for example when due to a mischance the leg 5 comes to sit on one of the noses 28 in such a manner that it cannot slip down the oblique face 29. If the two sensors ascertain the occurrence of such an oblique position, an alarm signal for example, can be triggered thereby so that an operator can correct the error. The sensors 36 are, preferably, non-contacting distance or spacing sensors.

Figure 4:
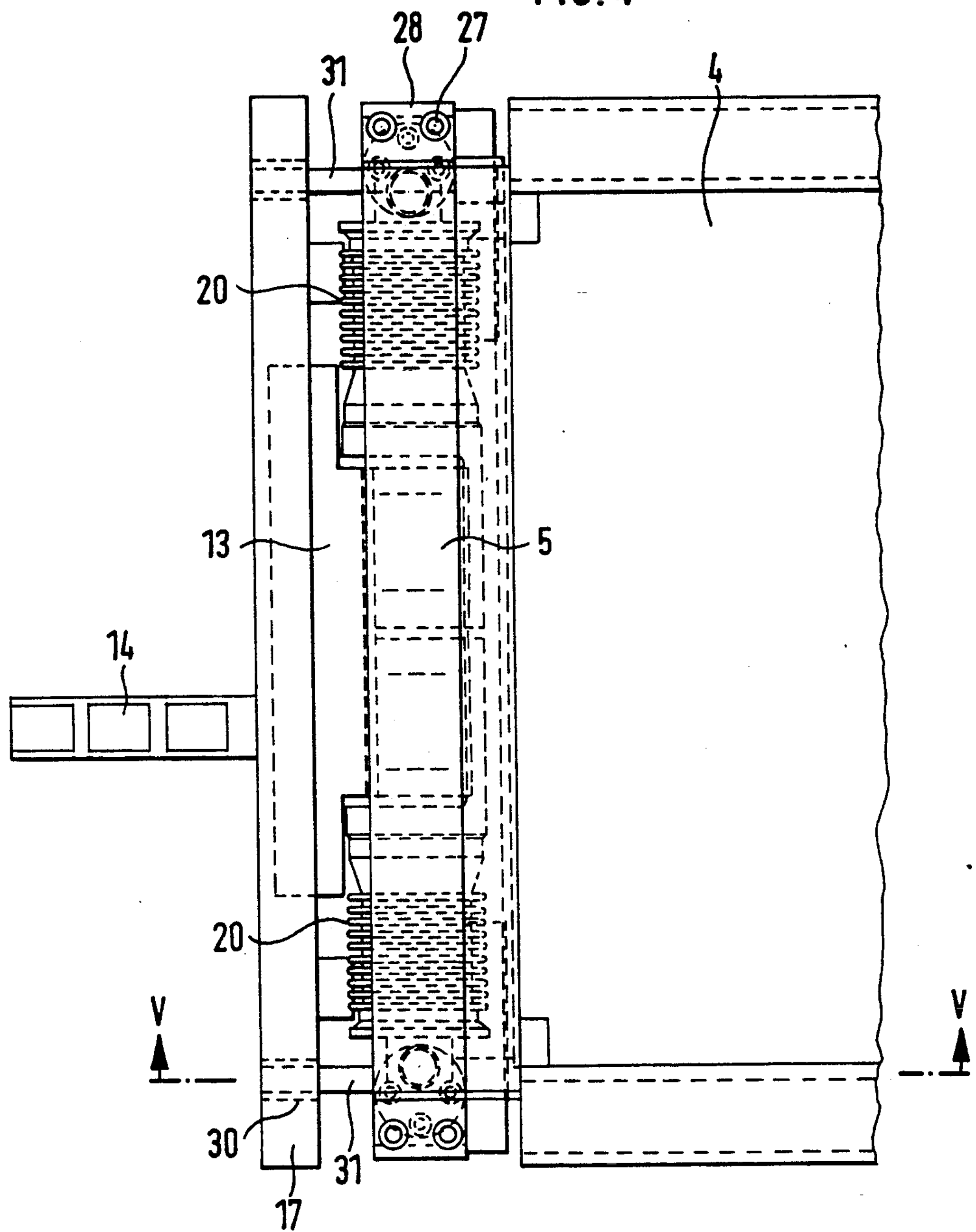
FIG. 4 is a plan view of the load forks in the region IV of FIG. 1.

As can be seen especially from FIG. 4, the two transverse beams 20 are arranged to be exactly parallel to the end wall of the magazine 4. For design reasons it may be expedient for the outer ends 23 of the transverse beams 20 to lie closer to one another, that is to be secured, together with the rubber buffers 24, more towards the middle of a correspondingly shorter reception beam 18.

Figure 9:
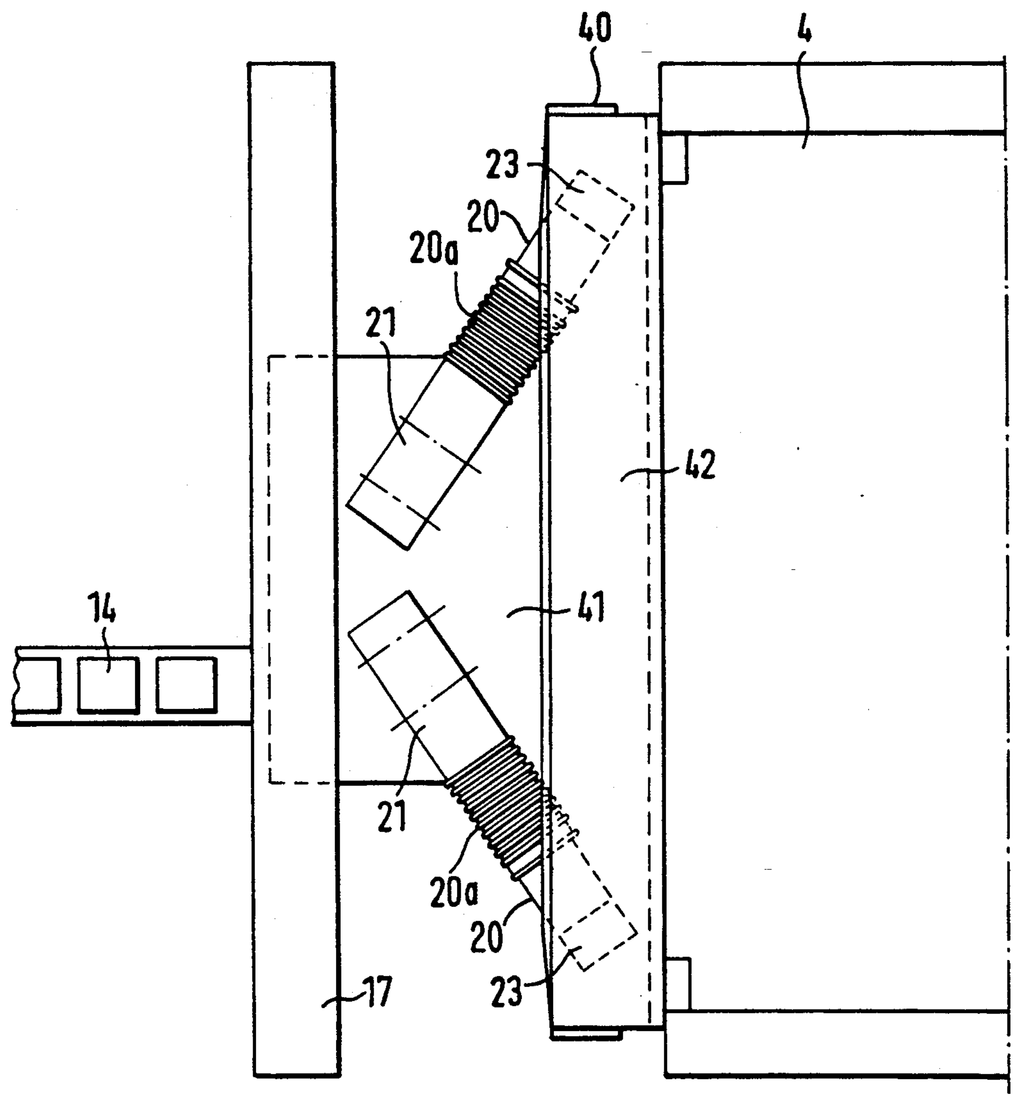
FIG. 9 shows in plan view a modified form of construction corresponding to the illustration in FIG. 6.

This can be achieved according to FIG. 9 in that the inner attachment ends 21 of the transverse beam 20 are spaced from each other by a greater distance, with respect to the end wall of the magazine 4, than the outer ends 23, connected with the reception beam 40. For this purpose, the reception bracket 41 can be made somewhat longer than bracket 13, transversely of the storage space, so that there is room for the described oblique position of the transverse beam 20. In this way, the reception beam 40 can likewise be made shorter in the longitudinal direction of the storage space than the associated leg 42 of the magazine 4. The T-form of the receiver is however retained even here.

Various changes and modifications may be made within the scope of the inventive concept.

I claim:

1. Combined material handling and weighing apparatus to determine the weight of elongated material stored in pallet boxes or magazines (4), wherein said magazines or pallet boxes are stored on, and selectively removable from, a storage system defining an elongated storage space, wherein the storage system has at least one stacking frame;

a plurality of vertical shelf supports (2) and carrier arms (3) extending transversely from and secured on said vertical shelf supports, arranged one shelf support above another, and defining storage spaces for supporting said pallet boxes or magazines (4), said system further including a gantry crane (6) which bridges over the stacking frame and is mobile in the direction of the storage space, said gantry crane including vertical crane supports (7);

carriage means (15) movable up or down on said crane supports (7); and carrier brackets (13) secured to said carriage means, said carrier brackets extending horizontally, in operation, into said storage space for moving said pallet boxes or magazines, selectively, up or down;

and comprising a pallet box reception means (18, 40) adapted to engage a pallet box or magazine located on the carrier brackets;

beam means (20) supporting the pallet box reception means (18, 40) with spacing above the carrier bracket (13), said beam means extending essentially horizontally and parallel to an end wall of the pallet box or magazine, said beam means having a first end (21) secured to the carrier bracket (13), and a second end (23 secured to the pallet box reception means (18, 40); and weight sensing means (20*a*) coupled to said beam means (20) and to said carrier bracket.

2. The apparatus of claim 1, wherein two beam elements (20) are provided, forming said beam means; and wherein said beam elements extend from the first end (21) of each beam element and secured to the carrier bracket (13, 41) towards said second end (23) of each beam element in opposite direction toward the pallet box reception means (18, 40).

3. The apparatus of claim 2, wherein the width of the carrier bracket (13, 41) in the direction of said storage space corresponds essentially to the length of a portion of the beam element adjacent the first ends (21) of the beam elements (20).

4. The apparatus of claim 2, wherein said beam elements (20) extend parallel to an wall of said pallet boxes or cassettes (4).

5. The apparatus of claim 2, wherein (FIG. 9) the first ends (21) of the beam means (20) coupled to the carrier bracket (41) have a greater spacing from the end wall of the pallet boxes or cassettes (4) than the second ends (23) coupled to the pallet box reception means (18, 40).

6. The apparatus of claim 1, wherein the pallet boxes or magazines include projecting horizontal leg means (5) extending from end walls of the pallet boxes or magazines; and wherein the pallet box reception means (18, 40) has a horizontal cross section which, essentially, corresponds to the distance of projection of said leg means (5); and wherein the beam means (20) is secured with its second end (23) to narrow end portions of said pallet box reception means.

7. The apparatus of claim 6, wherein the horizontal cross section of the reception means (18, 40) is larger in the direction of the storage space, and narrower transversely to said direction, than the space occupied by the leg means (5, 42) on the pallet boxes or magazines.

8. The apparatus of claim 6, wherein the pallet box reception means (18, 40) is formed with projections (28) which are spaced from each other by a distance corresponding to the width of said leg means (5, 42) in the direction of said storage space.

9. The apparatus of claim 8, wherein said projections (28) define free ends, which are inclined from their free ends and formed with inclined surfaces (29), receding from the leg means towards the free ends of the projections.

10. The apparatus of claim 1, wherein said beam means (20), in the direction of said storage space, comprises at least one elongated element which is narrow in transverse direction with respect to said storage space direction.

11. The apparatus of claim 1, wherein said weight sensing means comprises a mechanical strain—electrical signal transducer element.

12. The apparatus of claim 1, further including resilient means (24) coupling the second ends (23) of the beam means (20) to the pallet box reception means (18, 40).

13. The apparatus of claim 12, wherein said resilient means comprises elastomer or rubber mounts or buffers (24).

14. The apparatus of claim 12, wherein said resilient means comprises elastomer or rubber mounts, and reinforcement plates (25, 26) of wear-resistant material, optionally metal plates, bonded to said elastomer mounts.

15. The apparatus of claim 1, further including positioning means (31) on the carrier brackets (13) loosely positioning the pallet box reception means (18, 40) on the respective carrier bracket (13, 41), longitudinally and transversely with respect to the storage space direction.

16. The apparatus of claim 15, wherein said positioning means comprises a bolt (31) radially secured in bores (30) formed in the carrier bracket (13, 41), said bolt having a head (34) at its end remote from said pallet box reception means (18, 40) fitted, with axial and radial clearance and play, in an enlarged end portion of said bores.

17. The apparatus of claim 1, wherein the beam means (20) extend parallel to an end wall of the pallet boxes or cassettes (4).

18. The apparatus of claim 1, wherein said pallet box reception means comprises an elongated element;

and further including tilt sensor means (36) located at end portions of said element forming the elongated pallet box reception means (18, 40) for sensing parallel position of the pallet box reception means (18, 40) and the carrier bracket (13, 41).

19. The apparatus of claim 18, wherein said sensor means (36) comprise non-contacting distance sensors.

* * * * *